(12) United States Patent
Burcar et al.

(10) Patent No.: US 9,505,430 B2
(45) Date of Patent: Nov. 29, 2016

(54) TECHNIQUES FOR DEACTIVATING STEERING WHEEL ACTUATORS TO PREVENT UNINTENDED ACTUATION

(71) Applicants: James M Burcar, Rochester, MI (US); Jeffrey C Hendry, Waterford, MI (US); Michael Mashkevich, West Bloomfield, MI (US)

(72) Inventors: James M Burcar, Rochester, MI (US); Jeffrey C Hendry, Waterford, MI (US); Michael Mashkevich, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 27 days.

(21) Appl. No.: 14/286,094

(22) Filed: May 23, 2014

(65) Prior Publication Data

US 2015/0336608 A1 Nov. 26, 2015

(51) Int. Cl.
*B62D 6/10* (2006.01)
*B60W 50/12* (2012.01)

(52) U.S. Cl.
CPC ............... *B62D 6/10* (2013.01); *B60W 50/12* (2013.01); *B60K 2350/928* (2013.01); *B60W 2520/14* (2013.01); *B60W 2540/18* (2013.01)

(58) Field of Classification Search
CPC ............ B60Q 1/00; B60Q 9/00; B60Q 1/48;
B62D 15/029; B62D 1/046; B62D 1/181;
B62D 15/02; B62D 6/10; B62D 15/0285;
B60W 30/14; B60W 10/10; B60W 30/17;
B60W 10/184; B60W 50/10; B60W 50/08;
B60W 10/18; B60W 10/20; B60W 50/082;
B60W 50/12; G06F 17/00; G06F 3/041;
B60K 31/06; B60K 37/06; G05D 3/00;
B52D 15/026; H04N 7/18; H04N 7/183;
F16H 59/66; B60R 1/04; G08G 1/14; B62K 3/00

See application file for complete search history.

(56) References Cited

U.S. PATENT DOCUMENTS

| | | | |
|---|---|---|---|
| 7,012,550 B2 | 3/2006 | Iwakiri et al. | |
| 8,346,310 B2 | 1/2013 | Boll et al. | |
| 2004/0024504 A1* | 2/2004 | Salib | B60G 17/0162 701/38 |
| 2008/0174415 A1* | 7/2008 | Tanida | B60Q 9/00 340/438 |
| 2009/0138168 A1* | 5/2009 | Labuhn | B60W 10/10 701/93 |
| 2010/0288567 A1* | 11/2010 | Bonne | B60K 37/06 178/18.01 |
| 2012/0283894 A1 | 11/2012 | Naboulsi | |
| 2013/0325264 A1* | 12/2013 | Alcazar | B62D 1/181 701/49 |
| 2014/0022070 A1* | 1/2014 | Golomb | B60Q 1/0082 340/475 |
| 2015/0217807 A1* | 8/2015 | Schumacher | B60W 50/10 701/41 |

* cited by examiner

*Primary Examiner* — Behrang Badii
(74) *Attorney, Agent, or Firm* — Ralph E Smith

(57) ABSTRACT

Techniques are provided for deactivating or disabling one or more actuators of a steering wheel of a vehicle to prevent unintended actuation. In one example, the techniques include detecting, at a controller of the vehicle, a deactivation condition, which includes an operating condition of the vehicle indicative of a lack of interaction by a driver with the one or more actuators of the steering wheel. The one or more actuators are configured to receive an input from the driver to control or actuate one or more associated vehicle systems. In response to detecting the deactivation condition, the techniques include deactivating or disabling, by the controller, the one or more actuators of the steering wheel until the deactivation condition is no longer present.

8 Claims, 4 Drawing Sheets

TECHNIQUES FOR DEACTIVATING STEERING WHEEL ACTUATORS TO PREVENT UNINTENDED ACTUATION

FIELD

The present disclosure relates generally to vehicle systems and, more particularly, to techniques for disabling or deactivating steering wheel actuators to prevent accidental or unintended actuation.

BACKGROUND

A driver of a vehicle uses a steering wheel to control the vehicle's wheels in order to steer the vehicle. In one exemplary implementation, the steering wheel controls a rack and pinion system, which in turn controls the wheels. The steering wheel typically has one or more actuators ("actuators") that are configured to control other systems of the vehicle. Examples of these other systems include an entertainment system (audio, video, etc.), a hands-free telephone system, a navigation system, a cruise control system, and an in-dash information system. These actuators are located on the steering wheel so the driver is able to control these other systems while driving the vehicle. While driving the vehicle, however, the driver could accidentally or unintentionally actuate one of more of the actuators, which could activate its corresponding system. Accidental or unintended activation of these systems could annoy and/or disrupt the driver's operation of the vehicle. Thus, while such steering wheel actuators and systems work for their intended purpose, there remains a need for improvement in the relevant art.

SUMMARY

In one aspect, a vehicle is provided in accordance with the teachings of the present disclosure. In an exemplary implementation, the vehicle includes a steering wheel having one or more actuators and adapted to receive an input from a driver to control or actuate one or more associated vehicle systems. The vehicle also includes a controller configured to: detect a deactivation condition, the deactivation condition being a predetermined condition indicative of a lack of the input from the driver to the one or more actuators, and in response to detecting the deactivation condition, deactivating or disabling the one or more actuators of the steering wheel until the deactivation condition is no longer present.

In another aspect, a method is provided in accordance with the teachings of the present disclosure. In an exemplary implementation, the method includes detecting, at a controller of a vehicle, a deactivation condition. The deactivation condition includes an operating condition of the vehicle indicative of a lack of interaction by a driver with one or more actuators of a steering wheel of the vehicle. The one or more actuators are adapted to receive an input from the driver to control or actuate one or more associated vehicle systems. The method also includes, in response to detecting the deactivation condition, deactivating or disabling, by the controller, the one or more actuators of the steering wheel until the deactivation condition is no longer present.

In some implementations, the predetermined or operating condition is the vehicle being in a process of parking. In some implementations, the controller detects that the vehicle is in the process of parking when a speed of the vehicle is less than a predetermined vehicle speed. In some implementations, the controller detects that the vehicle is in the process of parking when a transmission of the vehicle is in a reverse gear. In some implementations, the controller detects that the vehicle is in the process of parking when a parallel parking mode of the vehicle is enabled. In some implementations, the controller detects whether the vehicle is in the process of parking based on information from a sensor or a camera/image system of the vehicle.

In some implementations, the predetermined or operating condition is based on a degree of rotation of the steering wheel. In some implementations, the controller detects the deactivation condition when at least one of (i) the degree of rotation of the steering wheel is greater than a predetermined degree of rotation and (ii) a rate of change of the degree of rotation of the steering wheel is greater than a predetermined rate of rotation change.

In some implementations, the predetermined or operating condition is based on a yaw angle of a pair of wheels of the vehicle associated with the steering wheel. In some implementations, the controller detects the deactivation condition when at least one of (i) the yaw angle of the pair of wheels is greater than a predetermined yaw angle and (ii) a yaw rate of the pair of wheels is greater than a predetermined yaw rate.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As mentioned above, there remains a need in the art of steering wheel systems to prevent accidental or unintended actuation of steering wheel actuators. Accordingly, techniques are presented for disabling or deactivating steering wheel actuators to prevent accidental or unintended actuation. In one exemplary implementation, the techniques detect a disable or deactivation condition. One example of this condition is the vehicle is parking. Example factors for detecting that the vehicle is parking include vehicle speed being less than a predetermined speed, a transmission being in a reverse gear, a parallel parking mode of the vehicle being enabled, and parking sensor/camera data indicating the vehicle is parking. Other examples of the disable or deactivation condition include steering wheel degree of rotation and/or its rate of change greater than respective predetermined levels and wheel yaw angle and/or wheel yaw rate greater than respective predetermined levels. It will be appreciated that the term "accidental" as used herein refers to any accidental or unintended/unintentional actuation of steering wheel actuators by a driver of a vehicle. It will be appreciated that the term "deactivate" as used herein refers to any electrical/electronic deactivation of steering wheel actuators or disabling, e.g., overriding, of the steering wheel actuators.

Figure 1:
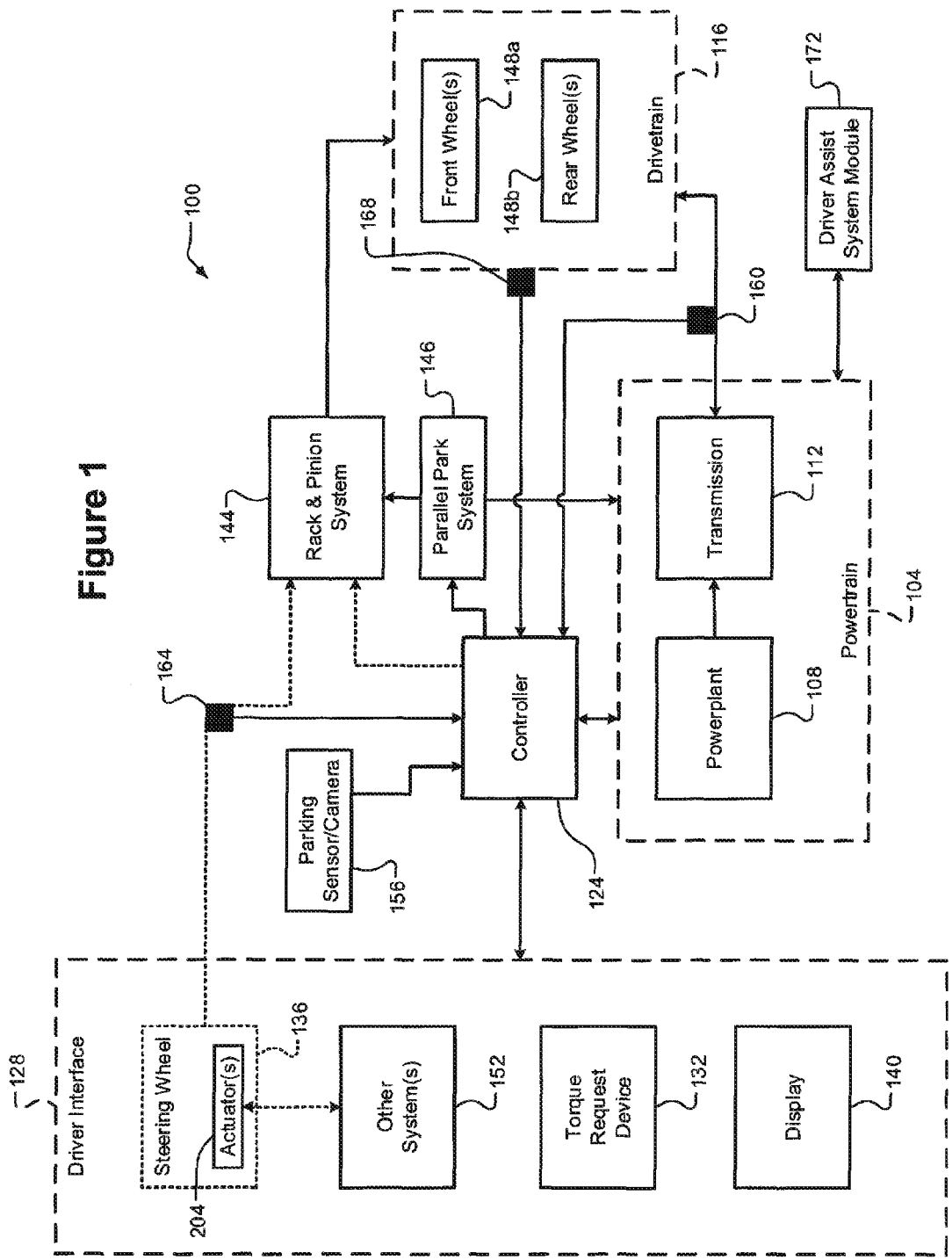
FIG. 1 is an example functional block diagram of a vehicle according to the principles of the present disclosure.

Referring now to FIG. 1, an example functional block diagram of a vehicle 100 is illustrated. The vehicle 100 includes a powertrain 104 including a powerplant 108 that generates drive torque and a transmission 112 that transfers the drive torque to a drivetrain 116 of the vehicle 100. Examples of the powerplant 108 include an engine (spark ignition, diesel, homogeneous charge compression ignition (HCCI), etc.), an electric motor, a battery system, or a combination thereof. The transmission 112 is any suitable device configured to transfer the drive torque from the powerplant 108 to the drivetrain 116. Depending on a configuration of the drivetrain 116 (rear wheel drive, front wheel drive, all-wheel drive, etc.), the drive torque could be transferred to one or more front wheels 148a ("front wheels 148a"), one or more rear wheels 148b ("rear wheels 148b"), or a combination thereof.

A controller or control module 124 controls operation of the vehicle 100. It will be appreciated that the term "controller" as used herein refers to any suitable control module, controller or computing device having one or more processors. It will also be appreciated that the term "controller" refers to both a single controller and two or more controllers operating in a parallel or distributed architecture. The controller 124 receives other input from the driver via a driver interface 128. In one exemplary implementation, the driver interface 128 includes a torque request device 132, e.g., an accelerator pedal, a steering wheel 136, and a display 140. Steering input from the driver via the steering wheel 136 is communicated to a rack and pinion system 144 either directly or optionally via the controller 124 (also known as "drive-by-wire"). The rack and pinion system 144 controls the front wheels 148a of the vehicle 100 to adjust steering of the vehicle 100. In one exemplary implementation, the rear wheels 148b could also be controlled by the rack and pinion system 144 or another suitable system, e.g., four wheel steering. A parallel park system 146, when enabled (a "parallel parking mode" of the vehicle 100), is configured to control the rack and pinion system 144 and the powertrain 104 (e.g., the powerplant 108) to automatically maneuver the vehicle 100 into a parallel parking spot without intervention from the driver.

The steering wheel 136 includes one or more actuators 204 ("actuators 204"). The driver interface 128 also includes one or more other systems 152 ("other systems 152"). The actuators 204 are associated with the other systems 152 of the vehicle 100. Examples of the other systems 152 include an entertainment or infotainment system, a hands-free telephone system, a navigation system, a cruise control system, and an in-dash information system, or a combination thereof. For example only, the actuators 204 could be used to control a volume of the entertainment or infotainment system. A parking sensor, camera, and/or image system 156 is configured to capture information (sensor data, image data, a combination thereof, etc.) that is utilized by the controller 124 to determine whether the vehicle 100 is in a process of parking. For example only, sensor data could indicate proximate/nearby objects and/or camera data could indicate a parking lot or proximate/nearby parked cars.

The controller 124 also receives information from other sensors. A vehicle speed sensor 160 measures a speed of the vehicle 100. Examples of the vehicle speed sensor 160 include a transmission output shaft speed (TOSS) sensor and a wheel speed sensor, such as utilized with an anti-lock braking system (ABS). A steering angle/rate sensor 164 measures an angle or degree of rotation of the steering wheel 136 ("steering angle"), e.g., with respect to a default/straightforward position, and/or a rate of change of the steering angle. A wheel yaw angle/rate sensor 168 measures a yaw angle of a particular set of the wheels, e.g., the front wheels 148a, and/or a rate of change of the yaw angle ("yaw rate") of the particular set of wheels. In one exemplary implementation, some or all of this information is used to detect the deactivation condition, which is described in greater detail below.

In one exemplary implementation, the vehicle 100 includes separate controllers (not shown) each configured for different functions. For example only, the vehicle 100 could include (i) a steering wheel controller that handles input via the actuators 204 and (ii) a primary vehicle controller that controls all other operation of the vehicle. In this example, the primary vehicle controller could intercept (e.g., en route to the other systems 152, such as an entertainment system) or directly receive messages from the actuators 204 to the steering wheel controller. In other words, the actuators 204 could not be electronically deactivated but could effectively be disabled by the primary vehicle controller overriding the steering wheel controller. In one exemplary implementation, at least some of the other systems 152, such as the cruise control system, can be implemented by a driver assist system module 172.

Figure 2:
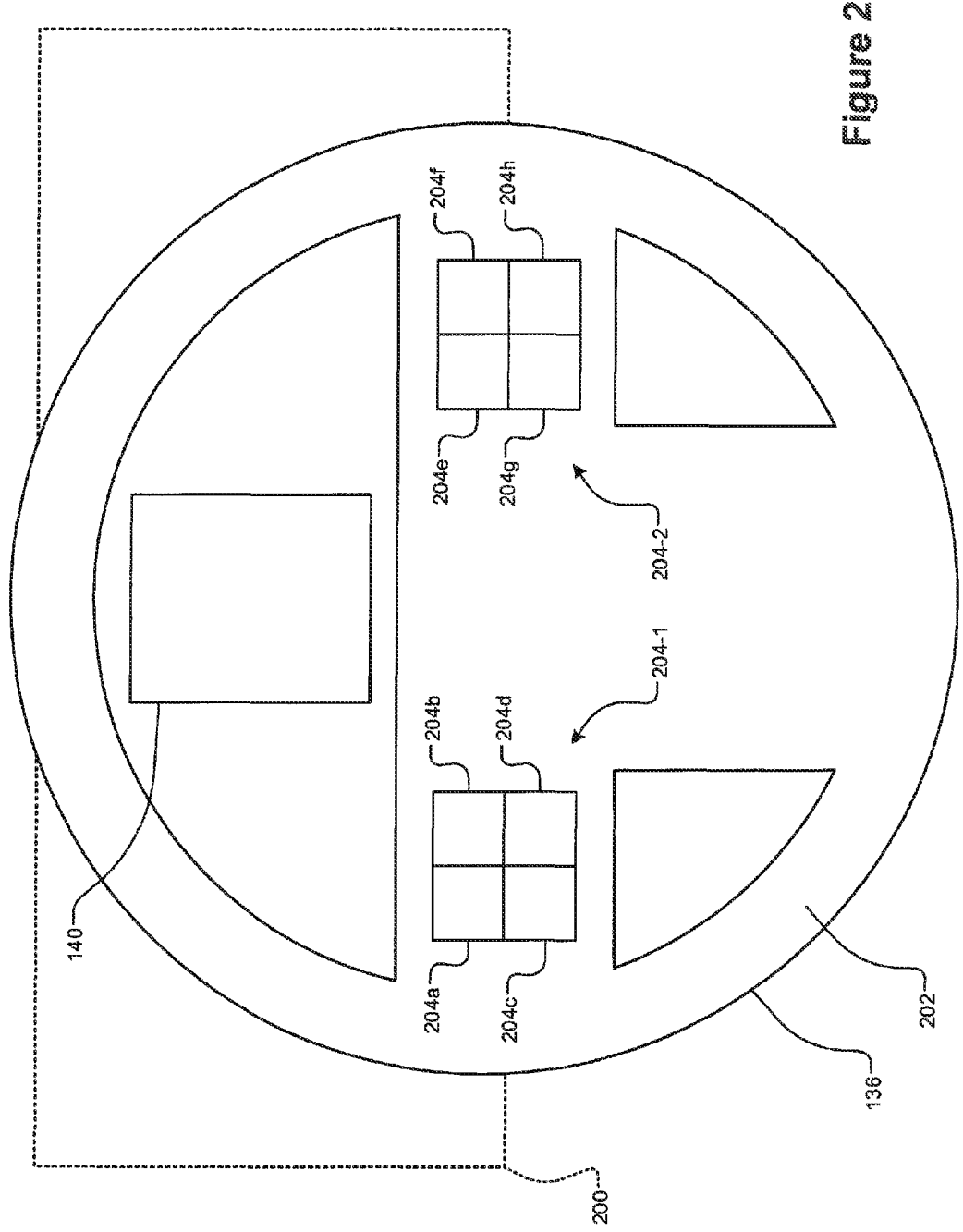
FIG. 2 is an example schematic diagram of a steering wheel according to the principles of the present disclosure.

Referring now to FIG. 2, an example schematic of the steering wheel 136 and the display 140 from a perspective of the driver is illustrated. The steering wheel 136 is arranged proximate to a dashboard console 200 of the vehicle 100. The display 140 is incorporated into the dashboard console 200 (also known as an "in-dash display"). The dashboard console 200 could also include other components (not shown) such as gauges (vehicle speed, engine speed, engine temperature, fuel quantity, etc.). It will be appreciated that the display 140 could also be another suitable display configured to convey information to the driver of the vehicle 100 (a center console display, a radio display, a navigation display, a display incorporated into a rear-view mirror, a heads-up display, etc.). In one exemplary implementation, the display 140 displays information in response to actuation of the actuators 204 by the driver, such as general vehicle information (fuel economy, vehicle speed, tire pressure, etc.).

In one exemplary implementation, a front side 202 of the steering wheel 136 includes two sets of actuators 204-1 and 204-2. The left set of actuators 204-1 includes four actuators 204a, 204b, 204c, and 204d. Similarly, the right set of actuators 204-2 includes four actuators 204e, 204f, 204g, and 204h. In one exemplary implementation, the left set of actuators 204-1 are to be actuated by a left thumb finger of the driver and the right set of actuators 204-2 are to be actuated by a right thumb finger of the driver while maintaining his/her hands on the steering wheel 136. All of these actuators are collectively referred to as the actuators 204. It will be appreciated that the steering wheel 136 could also include actuators in other suitable arrangements, such as on a back side of the steering wheel 136. Examples of the actuators 204 include single push buttons and two-way buttons, e.g., up/down. It will be appreciated, however, that any suitable actuation device(s) could be used for the actuators 204. The actuators 204 are typically associated with operating parameters the other systems 152 of the vehicle 100, such as an entertainment system. For example only, the actuators 204 could be used to control a volume of the entertainment system.

In one exemplary implementation, when the controller 124 detects the deactivation condition, the controller 124 deactivates the actuators 204. The deactivation condition represents any condition in which the driver is not interacting or intending to interact with the actuators 204. Examples of the deactivation condition include scenarios where the driver is interacting with the steering wheel 136 heavily or aggressively. One exemplary scenario is when the driver is in the process of parking the vehicle 100. During parking, the driver typically is turning the steering wheel 136 to a large degree and often turning their head to the side or to look behind them. Thus, during parking, the driver is likely to accidentally or unintentionally actuate the actuators 204 as a byproduct of this interaction with the steering wheel 136. Another exemplary scenario is a sharp turn during driving, i.e., not during parking. For example only, the driver could be maneuvering the vehicle 100 through a U-turn (e.g., a 180-degree turn) or any other "sharp turn" where significant turning of the steering wheel 136 is required.

The deactivation condition, therefore, is represented by parameters indicative of these scenarios described above. In one exemplary implementation, the controller 124 detects that the vehicle 100 is in the process of parking when the vehicle speed is less than a predetermined speed. For example only, this predetermined speed could be a few miles per hour. In one exemplary implementation, the controller 124 could detect whether the vehicle speed has been less than the predetermined speed (but also non-zero) for longer than a predetermined period, which could indicate that the vehicle 100 is in the process of parking as opposed to stopped at a stop sign or traffic light and then beginning to move again. In another exemplary implementation, the controller 124 detects that the vehicle 100 is in the process of parking when the transmission 112 is in a reverse gear and/or when the parallel parking mode of the vehicle 100 (the parallel parking system 146) is enabled. In yet another exemplary implementation, the controller 124 detects that the vehicle 100 is in the process of parking based on data from the parking sensor/camera 156. For example only, the parking sensor/camera could provide data indicative of nearby parked cars and/or known attributes or features of a parking lot (parking space lines, parking meters, curbs, etc.).

As mentioned above, the deactivation condition could also be representative of sharp turns in non-parking situations. Thus, in one exemplary implementation, the controller 124 detects that an angle or degree of rotation of the steering wheel 136 is greater than a predetermined level. For example, this angle or degree of rotation could be with respect to a default steering wheel position (also known as a straightforward position). This could indicate that the driver is maneuvering the vehicle 100 through a sharp turn. In one exemplary implementation, the controller 124 detects that a rate of change of the angle or degree of rotation of the steering wheel 136 is greater than a predetermined rate. This could also indicate that the driver is maneuvering the vehicle 100 through a sharp turn. Similarly, in one exemplary implementation the controller 124 could detect that a yaw angle or yaw rate of a set of the wheels, e.g., the front wheels 148a, is greater than respective predetermined levels. These could also indicate that the driver is maneuvering the vehicle 100 through a sharp turn, and could be directly or indirectly related to the parameters of the steering wheel 136.

In accordance with various aspects of the present disclosure, the deactivation condition is detected in response to at least one of the above. It will be appreciated, however, that the deactivation condition could be detected in response to other inputs, such as an in-vehicle camera that detects that the driver is looking behind the vehicle 100 and thus is no longer focused on the steering wheel 136. In response to detecting the deactivation condition, the controller 124 deactivates the actuators 204 until the deactivation condition is no longer present. As discussed herein, deactivating the actuators 204 refers to electrically or electronically deactivating the actuators 204 or disabling the actuators 204 by overriding or intercepting their messages/communications to the other systems 152. It will be also appreciated that in one exemplary implementation, the deactivation techniques of the present disclosure could be enabled/disabled by drivers according to their preferences.

Figure 3:
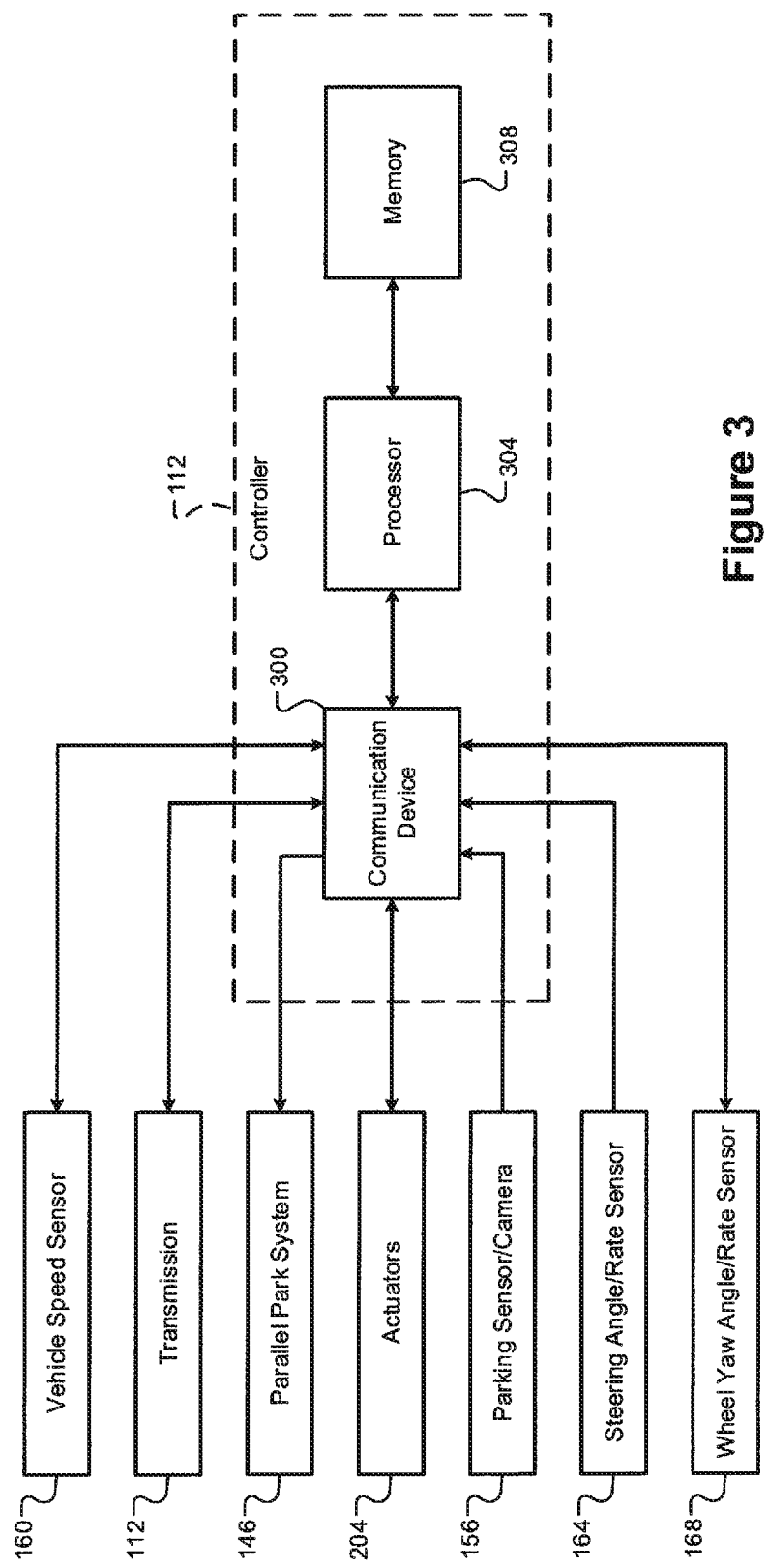
FIG. 3 is an example functional block diagram of a controller according to the principles of the present disclosure.

Referring now to FIG. 3, an example functional block diagram of the controller or control module 124 is illustrated. In one exemplary implementation, the controller 124 includes a communication device 300, a processor 304, and a memory 308. The communication device 300 includes any suitable components (e.g., a transceiver) configured for communication with other components of the vehicle 100 via a controller area network. The processor 304 controls operation of the controller 124 and is configured to implement at least a portion of the steering wheel actuator deactivation techniques as discussed herein. It will be appreciated that the term "processor" as used herein refers to both a single processor and two or more processors operating in a parallel or distributed architecture. The memory 308 is any suitable storage medium (flash, hard disk, etc.) configured to store information at the controller 124.

Figure 4:
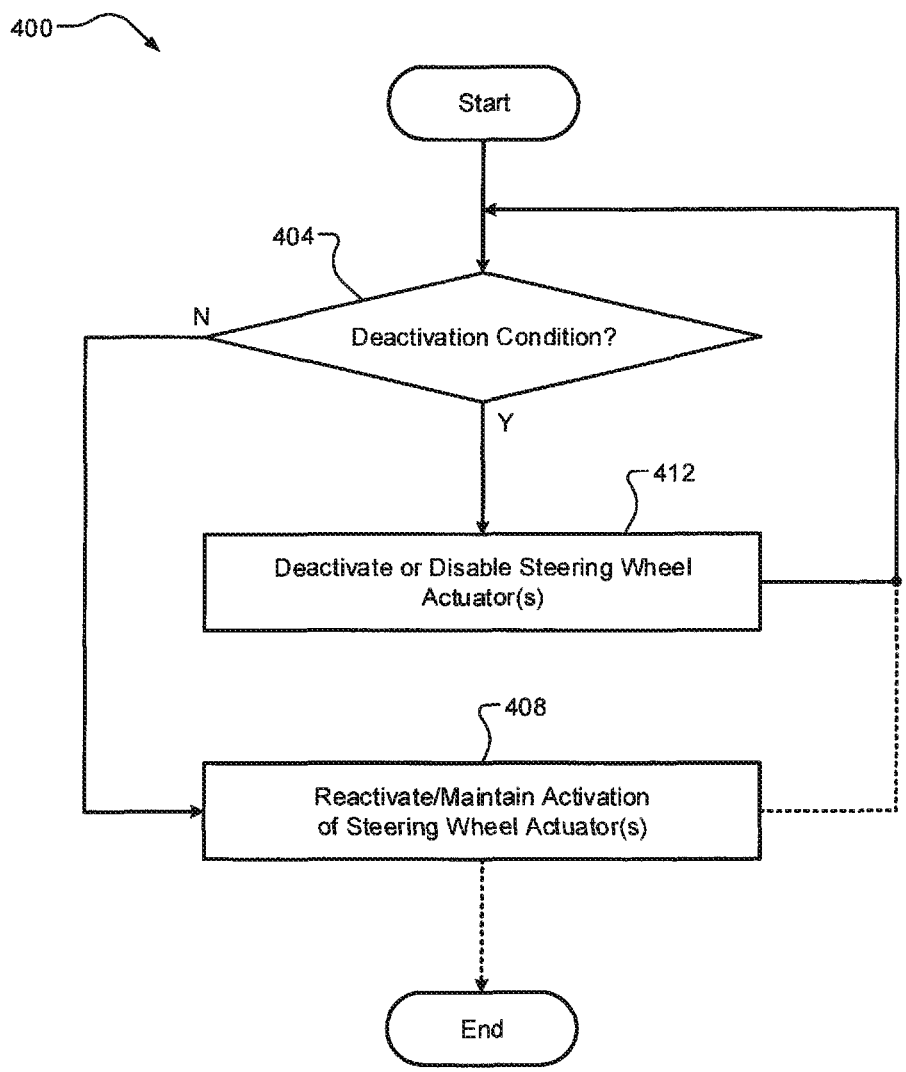
FIG. 4 is an example flow diagram of an exemplary method for disabling or deactivating steering wheel actuators to prevent accidental or unintended actuation according to the principles of the present disclosure.

Referring now to FIG. 4, an example flow diagram of a method 400 for deactivating steering wheel actuators to prevent accidental or unintended actuation is illustrated. At 404, the controller 124 determines whether the deactivation condition is detected. Examples of the deactivation condition include the vehicle 100 is parking or performing a sharp turn. If the deactivation condition is not detected, the method 400 proceeds to 408. At 408, the controller 124 reactivates or maintains activation of the actuators 204 of the steering wheel 136. The method 400 then ends or returns to 404 for one or more additional cycles. If the deactivation condition is detected, the method 400 proceeds to 412. At 412, the controller 124 deactivates the actuators 204 of the steering wheel 136. The method 400 then returns to 404 and thus the actuators 204 of the steering wheel 136 remain deactivated until the deactivation condition is no longer detected.

It should be understood that the mixing and matching of features, elements, methodologies and/or functions between various examples could be expressly contemplated herein so that one skilled in the art would appreciate from the present teachings that features, elements and/or functions of one example could be incorporated into another example as appropriate, unless described otherwise above.

What is claimed is:
1. A vehicle, comprising:
a steering wheel having one or more actuators configured to receive an input from a driver to control or actuate one or more associated vehicle systems; and
a controller configured to:
detect a deactivation condition including:
(i) a speed of the vehicle being less than a predetermined vehicle speed for a predetermined period of time indicative of the vehicle being in the process of parking, and

(ii) a transmission of the vehicle being in a reverse gear;

in response to detecting the deactivation condition, deactivating or disabling the one or more actuators of the steering wheel until the deactivation condition is no longer present, wherein the controller is configured to ignore the input received from the one or more actuators while they are deactivated or disabled.

2. The vehicle of claim 1, wherein in response to detecting the deactivation condition is no longer present, the controller is further configured to reactivate the one or more actuators of the steering wheel.

3. A method, comprising:

detecting, at a controller of a vehicle, a deactivation condition including:
(i) a speed of the vehicle being less than a predetermined vehicle speed for a predetermined period of time indicative of the vehicle being in the process of parking, and
(ii) a transmission of the vehicle being in a reverse gear; and in response to detecting the deactivation condition, deactivating or disabling, by the controller, one or more actuators of a steering wheel of the vehicle until the deactivation condition is no longer present, wherein the one or more actuators are configured to (i) receive an input from a driver of the vehicle to control or actuate one or more associated vehicle systems, and wherein the controller is configured to ignore the input received from the one or more actuators while they are deactivated or disabled.

4. The method of claim 3, further comprising reactivating, by the controller, the one or more actuators of the steering wheel in response to detecting, at the controller, that the deactivation condition is no longer present.

5. The vehicle of claim 1, wherein the deactivation condition further includes at least one of a yaw angle of a set of wheels of the vehicle and a rate of change of the yaw angle being greater than a respective yaw threshold.

6. The method of claim 3, wherein the deactivation condition further includes at least one of a yaw angle of a set of wheels of the vehicle and a rate of change of the yaw angle being greater than a respective yaw threshold.

7. The vehicle of claim 1, wherein the deactivation condition further includes a parallel parking mode of the vehicle being enabled.

8. The method of claim 3, wherein the deactivation condition further includes information from an image sensor or a camera of the vehicle that is indicative of the vehicle being in the process of parking.

* * * * *